(No Model.)
L. H. MONTROSS.
CLAPBOARD OR SIDING STRIP FOR HOUSES.
No. 512,986. Patented Jan. 16, 1894.
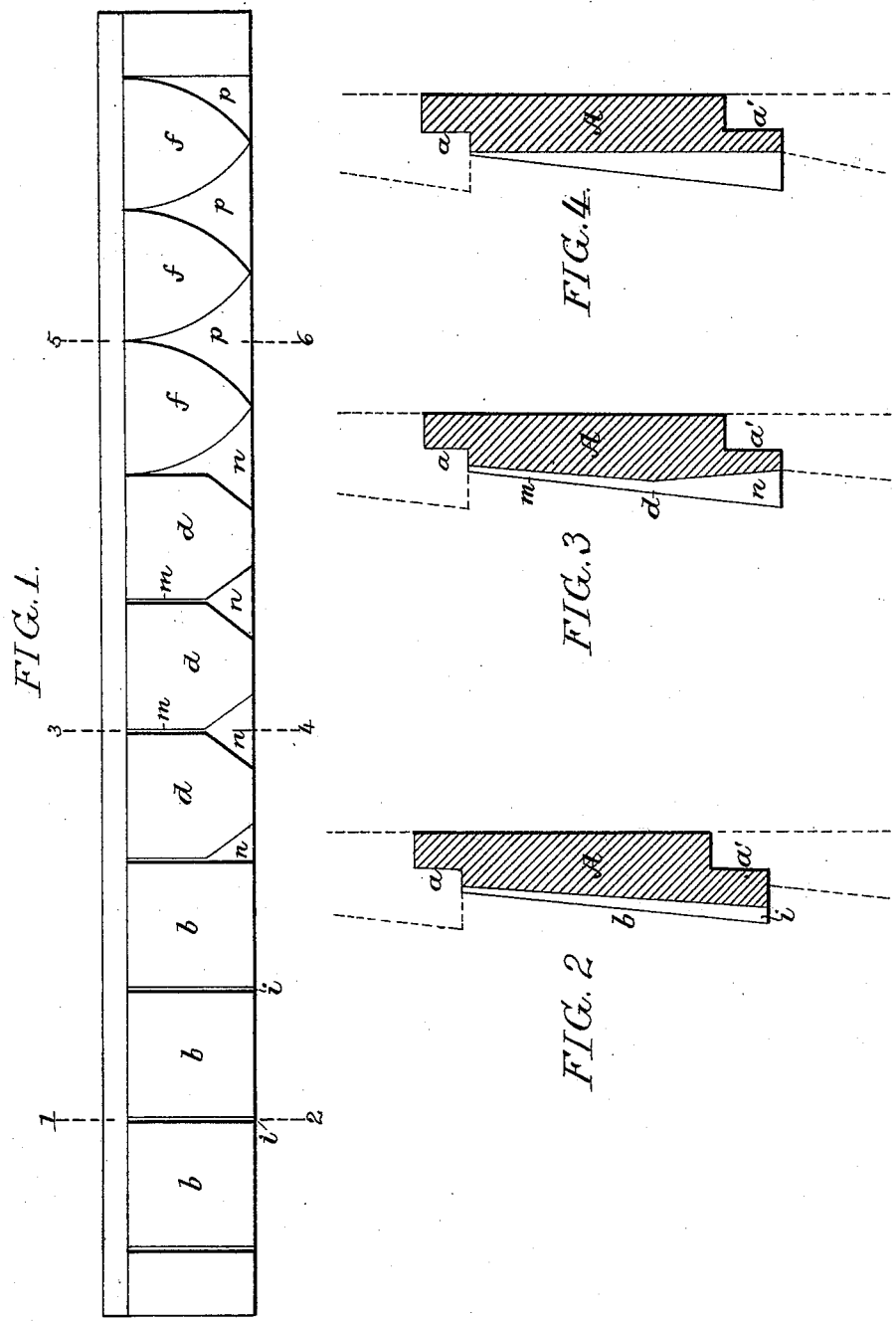
Witnesses:
Alex. Barkoff
Murray C. Boyer
Inventor:
Levi H. Montross
by his Attorneys
Howson & Howson

UNITED STATES PATENT OFFICE.

LEVI H. MONTROSS, OF CAMDEN, NEW JERSEY, ASSIGNOR, BY DIRECT AND MESNE ASSIGNMENTS, TO THE MONTROSS MANUFACTURING COMPANY, OF SAME PLACE.

CLAPBOARD OR SIDING-STRIP FOR HOUSES.

SPECIFICATION forming part of Letters Patent No. 512,986, dated January 16, 1894.

Application filed August 25, 1891. Serial No. 403,672. (No model.)

*To all whom it may concern:*

Be it known that I, LEVI H. MONTROSS, a subject of the Queen of Great Britain and Ireland, and a resident of Camden, Camden county, New Jersey, have invented certain Improvements in Clapboards or Siding-Strips for Houses, of which the following is a specification.

My invention relates to a clap board or siding strip of such character as to represent a line of shingles, a special feature of the invention being the means adopted for forming the representation of shingles in relief upon the body of the strip without unduly weakening or cutting away said body.

In the accompanying drawings:—Figure 1, is a face view of a clap board or siding strip made in accordance with my invention. Fig. 2, is a section, on an enlarged scale, on the line 1—2, Fig. 1. Fig. 3, is a similar section on the line 3—4, Fig. 1; and Fig. 4, is a like section on the line 5—6, Fig. 1.

A represents the body of the clap board or siding strip, which is rabbeted at top and bottom as shown at $a, a'$, so as to provide for the fitting together and interlocking of the successive strips or courses, as shown by dotted lines in Figs. 2, 3 and 4. On the face of each strip are formed in relief representations of ordinary forms of shingles, such as are used for the sides or gables of houses, three different patterns of shingles being shown upon the strip represented in Fig. 1, although it should be understood that each strip will, in most cases, represent but one style of shingle.

The representation of plain rectangular shingles $b$ is effected by forming simple saw kerfs $i$ in the face of the strip at suitable distances apart, and, as the strip is tapered or less in thickness at the top than at the bottom, these saw kerfs are likewise graduated in depth, being deepest at the bottom of the strip and shallowest at the top, as shown in Fig. 2, so that the thin upper edge of the strip is not unduly weakened by the formation of a deep saw kerf therein.

The representation of shingles $d$ having tapered ends is effected by saw kerfs $m$ separating the upper or wide portions of the shingles, and triangular recesses $n$ at the lower or tapering ends of the shingles, and in order that the tapered lower ends of the shingles may be in high relief, without unduly weakening the upper portion of the strip, the recesses $n$ flare or deepen more abruptly than the saw kerfs from the bottom of said saw kerfs to the bottom of the strip, as shown in Fig. 3, and in like manner the recesses $p$ which separate the representations of curved and pointed shingles $f$ flare or deepen from the top to the bottom of the strip, so that in both cases the lower portions of the representations are in high relief and yet the upper and thinner portion of the strip A preserves substantially its full thickness.

Having thus described my invention, I claim and desire to secure by Letters Patent—

1. A clap board or siding strip tapering in width from edge to edge and having representations of shingles formed in relief upon its outer face, and having the dividing kerfs or recesses between said representations, flared or deepened so as to be shallower at the upper than at the lower ends, substantially as specified.

2. A tapered clap board or siding strip, having representations of shingles formed in relief upon its outer face, and having between said representations, tapered dividing kerfs merging at their lower ends into more abruptly flared or deepened recesses, substantially as specified.

In testimony whereof I have signed my name to this specification in the presence of two subscribing witnesses.

LEVI H. MONTROSS.

Witnesses:
 JNO. E. PARKER,
 H. F. REARDON.